(12) United States Patent
Abrahamson et al.

(10) Patent No.: US 11,093,983 B1
(45) Date of Patent: Aug. 17, 2021

(54) SYSTEMS AND METHODS FOR BACKEND FULFILLMENT OF A SALES PRODUCT

(71) Applicant: Blueprint Nine, LLC, Pittsburgh, PA (US)

(72) Inventors: Kale Abrahamson, Pittsburgh, PA (US); Taylor Hiott, Verona, PA (US)

(73) Assignee: Blueprint Nine, LLC, Pittsburgh, PA (US)

( * ) Notice: Subject to any disclaimer, the term of this patent is extended or adjusted under 35 U.S.C. 154(b) by 0 days.

(21) Appl. No.: 17/025,772

(22) Filed: Sep. 18, 2020

(51) Int. Cl.
| G06Q 10/00 | (2012.01) |
| G06Q 30/02 | (2012.01) |
| G06Q 30/00 | (2012.01) |
| G06Q 10/06 | (2012.01) |
| G06Q 30/06 | (2012.01) |
| G06Q 50/00 | (2012.01) |

(52) U.S. Cl.
CPC ... *G06Q 30/0281* (2013.01); *G06Q 10/06316* (2013.01); *G06Q 30/018* (2013.01); *G06Q 30/0609* (2013.01); *G06Q 50/01* (2013.01)

(58) Field of Classification Search
CPC ........ G06Q 30/0281; G06Q 10/06316; G06Q 30/018; G06Q 50/01; G06Q 30/0609
See application file for complete search history.

(56) References Cited

U.S. PATENT DOCUMENTS

| 5,930,764 | A * | 7/1999 | Melchione ............. G06Q 30/02 705/7.29 |
| 7,216,087 | B2 | 5/2007 | Thompson et al. |
| 7,949,588 | B2 | 5/2011 | Willis |
| 10,115,168 | B2 | 10/2018 | Arroyo et al. |
| 2002/0123898 | A1* | 9/2002 | Lemay ................... G06Q 50/01 705/319 |
| 2009/0222327 | A1* | 9/2009 | Willis .................... G06Q 40/06 705/35 |
| 2011/0208603 | A1 | 8/2011 | Benefield et al. |
| 2012/0150759 | A1* | 6/2012 | Tarjan ................... G06Q 30/02 705/319 |
| 2012/0310692 | A1 | 12/2012 | Maiya et al. |
| 2013/0085785 | A1* | 4/2013 | Rogers .................. G06Q 10/06 705/4 |

(Continued)

OTHER PUBLICATIONS

Of Belt, Sam ("The Simple Test That Reveals Whether Prospects Will Actually Buy", https://blog.hubspot.com/sales/using-homework-in-the-sales-process. Oct. 20, 2019).*

(Continued)

*Primary Examiner* — Gabrielle A McCormick
(74) *Attorney, Agent, or Firm* — Dinsmore & Shohl LLP

(57) ABSTRACT

Embodiments of the present disclosure are directed to systems and methods where an enrollment team is trained to get the customer set up on the systems, a second welcome call is placed within a predetermined amount of time to the customer to further solidify the deal, using social media groups that require customers to "check in" to encourage customers to participate in the groups, using purposeful placement of key information and announcements in the groups, welcoming new members to the group and providing strategies to encourage and lift up those customers are participating the most and live streams are hosted directly within the groups and posting the livestream schedule in the groups.

12 Claims, 14 Drawing Sheets

(56) References Cited

U.S. PATENT DOCUMENTS

| | | | |
|---|---|---|---|
| 2014/0019880 A1* | 1/2014 | Kucera | H04L 51/32 |
| | | | 715/753 |
| 2014/0214473 A1 | 7/2014 | Gentile et al. | |
| 2014/0372168 A1* | 12/2014 | Markham | G06Q 30/01 |
| | | | 705/7.29 |
| 2016/0171511 A1 | 6/2016 | Goel et al. | |
| 2016/0260064 A1* | 9/2016 | Ahmed | H04L 67/306 |
| 2016/0343072 A1 | 11/2016 | Mohnot | |

OTHER PUBLICATIONS

P. Herzig, M. Ameling and A. Schill, ("A Generic Platform for Enterprise Gamification," 2012 Joint Working IEEE/IFIP Conference on Software Architecture and European Conference on Software Architecture, Helsinki, Finland, 2012, pp. 219-223, doi: 10.1109/WICSA-ECSA.212.33).*

King, B. (Aug. 6, 2019). Customer Onboarding—5 Steps to Drive User Activation. https://www.drift.com/blog/customer-onboarding/.

O'Doherty, P. (Aug. 26, 2016). Best Practices for Onboarding Customers. https://www.keep-grow.com/best-practices-for-onboarding-customers.

Saxena, N., & Saxena, R. (Sep. 2013). Leveraging Social Media in the World of Sales: An Untapped Potential. International Journal of Advanced Computer Research, 3(11), 145-152. doi:(ISSN (print): 2249-7277 ISSN (online): 2277-7970).

Patel, N. (Jan. 23, 2020). How to Double Your Sales Using Facebook Without Spending a Single Dollar. https://neilpatel.com/blog/double-sales-using-facebook/.

Kendall, J., Wright, G., Almazan, M. (Mar. 31, 2013). New Sales and Distribution Models in Mobile Financial Services. https://papers.ssm.com/sol3/papers.cfm?abstract_id=2241839.

* cited by examiner

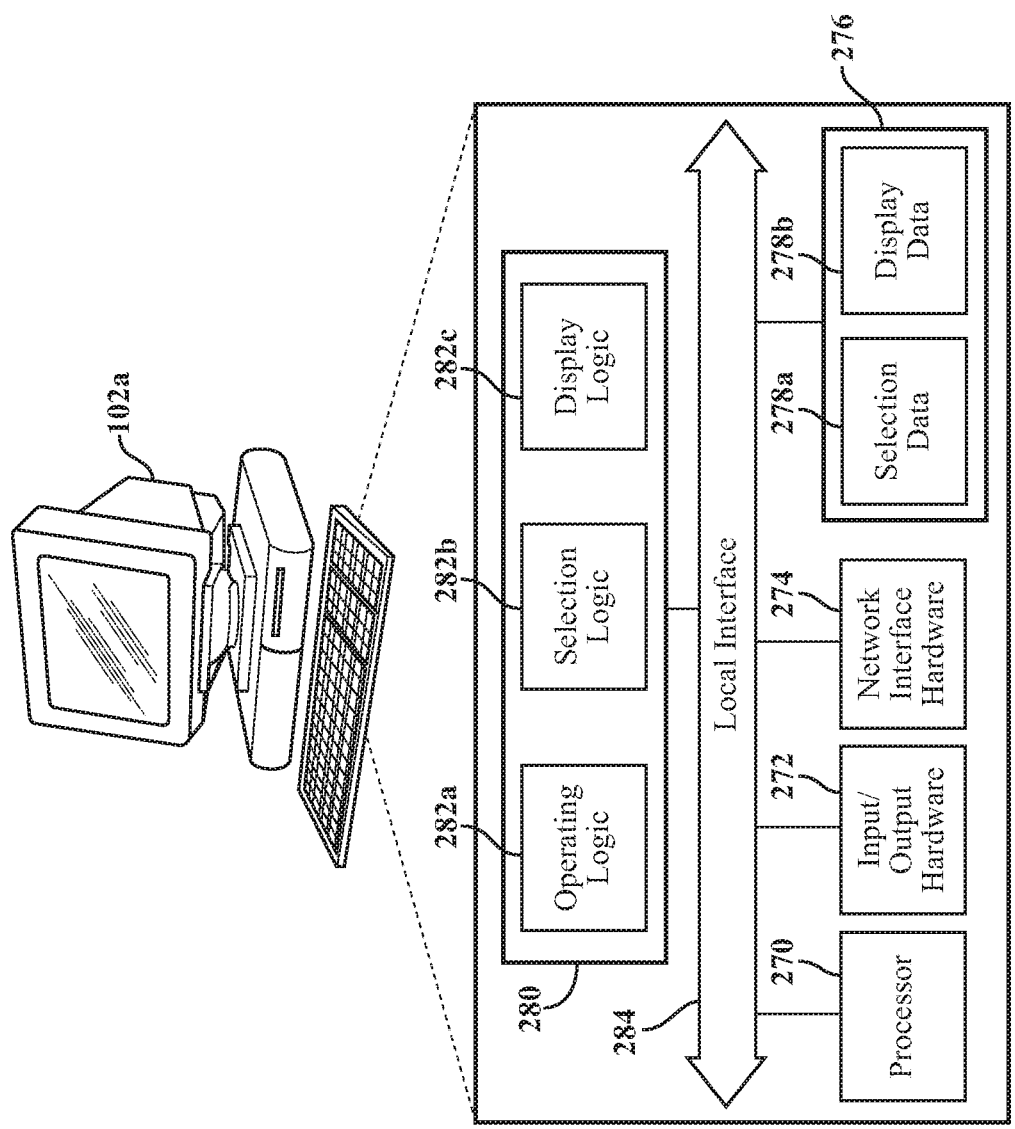

This is FastTrack

Because you are an VIP+ member you are entitled to FastTrack for LIFE.

One-on-One trained coaches available for you 24 hours a day.

415

FastTrack is Online ✕

Please fill out the form below to start chatting with the next available consultant

* Name

* Email

* What program are you in?

Start Chat

410

WATCH THIS VIDEO FIRST

▷

2:25

Isn't it time you FASTTRACKED your Online Marketplace success?
Instead of asking generic questions on a livestream, FAST TRACK allows our team to take a look at YOUR BRAND, and YOUR PRODUCT.

- 1 on 1 Instant Answers
- Specific ACTIONABLE advice on your specific ideas, product and market
- 24/7 Availability
- Questions ALWAYS answered by PROs
- White glove service
- For people that want success NOW!

FIG. 5

SYSTEMS AND METHODS FOR BACKEND FULFILLMENT OF A SALES PRODUCT

TECHNICAL FIELD

The present disclosure generally relates to a sales practice and, more particularly, to systems and methods for retaining bonafide leads for a particular sales product.

BACKGROUND

The internet has expanded a potential customer base. As such, new marketing and advertising methods are used to capture the attention of potential customers. Further, once a potential customer attention is captured, the potential customer must be sold on the idea or product before turning the potential customer into a customer. Companies spend enormous amounts of money to determine whether a potential customer may be a bonafide lead that will turn into a paying customer. However, bonafide leads still need to be nurtured and catered into ultimately buying the final product. One way of meeting potential customer needs while catering to the potential customer is during an onboarding teleconference call. During this onboarding teleconference call, it is known to use scripts and other sales tactics to persuade potential customers into purchasing a product. However, generally, a potential customer has to receive different phone calls from a sales team member, an enrollment team member, a payment processing team member, and the like, which is not efficient for the company and provides the potential customer with many opportunities to change their mind.

SUMMARY

In one embodiment, a method for generating a customer is provided. The method includes scheduling, by a bonafide lead, a communication appointment with a sales team member, sending, by an interface device, a first automatic text message to the bonafide lead that contains a link to a video, sending, by the interface device, a second automatic text message to the bonafide lead that contains a biographic information of an assigned sales team member, placing, by the sales team member, a confirmation call with the bonafide lead to confirm the communication appointment and conducting, by the assigned sales team member, a first sales call with the bonafide lead. The method continues by using, by the assigned sales team member, a plurality of setter scripts during the first sales call with the bonafide lead, providing, by a sales team member computing device, a homework assignment via a first e-mail for the bonafide lead to complete, determining, by the assigned sales team member, whether the bonafide lead qualifies for a second sales call, and conducting, by the assigned sales team member, the second sales call with the bonafide lead. Further, the method continues by receiving, by the assigned sales team member, a payment for a specific product or service, sending, by the sales team member computing device, a terms of service via a second e-mail for the bonafide lead to approve and notifying an enrollment team member of a confirmed customer. The notification of the enrollment team member occurs during the second sales call and the confirmed customer is transferred to a member of the enrollment team member before the assigned sales team member ends the second sales call with the confirmed customer.

In another embodiment, a system for displaying customer metrics is provided. The system includes a processing device and a non-transitory, processor-readable storage medium. The non-transitory, processor-readable storage medium is in communication with the processing device. The non-transitory, processor-readable storage medium includes one or more programming instructions that, when executed, cause the processing device to determine, by an interface device, a scoreboard for each confirmed customer, wherein the scoreboard includes a plurality of individual customer scores for each confirmed customer, wherein the plurality of individual customer scores for each confirmed customer includes product sales over a predetermined period and a numerical percentage for product sales over the predetermined period, display, on a customer computing device, the scoreboard for the confirmed customer within a social media group, indicate, on the customer computing device, whether the product sales over the predetermined period and the numerical percentage for product sales over the predetermined period are improved over the predetermined period by a visual indicator, and update, by the interface device, the scoreboard in real time.

In another embodiment, a system for providing a customized video is provided. The system includes a processing device and a non-transitory, processor-readable storage medium. The non-transitory, processor-readable storage medium is in communication with the processing device. The non-transitory, processor-readable storage medium includes one or more programming instructions that, when executed, cause the processing device to determine a video initiation request, determine a name of the recipient of the customized video, determine whether the name of the recipient of the customized video is saved in the non-transitory, processor-readable storage medium, retrieve a video clip that has the name of the recipient included in the video clip saved in the non-transitory, processor-readable storage medium, determine a type of prerecorded video based on a type of recipient of the customized video, retrieve and prepare the prerecorded video, merge the prerecorded video with the video clip that has the name or the variant of the name of the recipient into the customized video, and display, on a customer computing device, the customized video for the recipient.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 2B schematically depicts a customer computing device from FIG. 1, further illustrating hardware and software components that may be used to generate and maintain a customer from a bonafide lead for a particular sales product according to one or more embodiments described and illustrated herein;

FIG. 4 schematically depicts a fast track portal dashboard according to one or more embodiments described and illustrated herein;

FIG. 5 schematically depicts an overview of a sales process that may be used to generate and maintain a customer from a bonafide lead for a particular sales product according to one or more embodiments described and illustrated herein;

DETAILED DESCRIPTION

Figure 1:
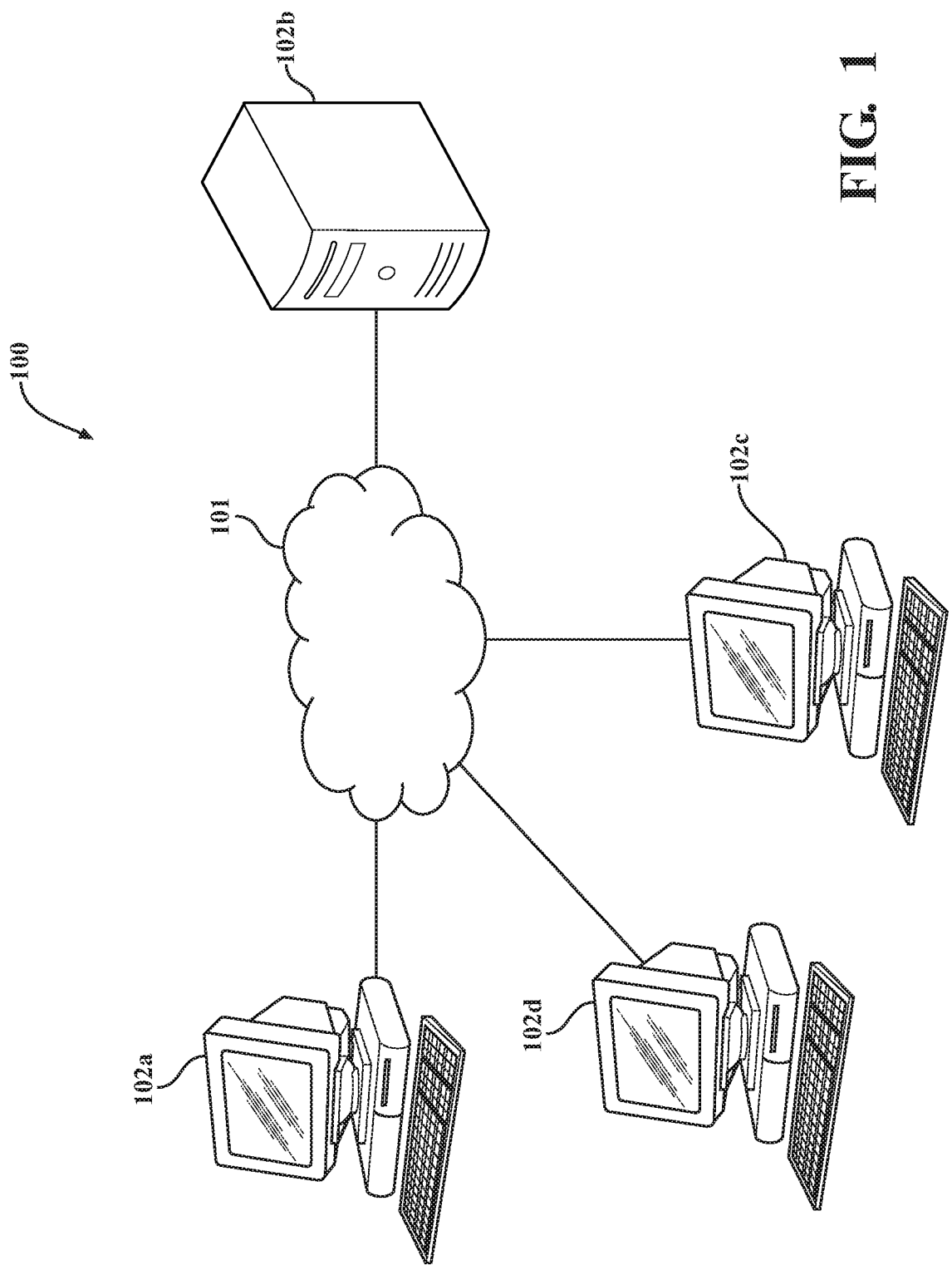
FIG. 1 schematically depicts an illustrative computing network for a system for identifying a bonafide lead for a particular sales product according to one or more embodiments described and illustrated herein.

Embodiments of the present disclosure are directed to systems and methods to generate and maintain a customer from a bonafide lead for a particular sales product, such as a training program. More specifically, the disclosed systems and methods provide an approach that provides a sales service to improve sales while minimizing refunds and lost sales. That is, the potential customer onboarding process has been systematically designed to improve customer satisfaction and reduce refunds. This is achieved by efficiently using a sales team to close a bonafide lead into a customer while simultaneously prepping an enrollment team, which is on standby, so that as soon as the now customer is prepped, the enrollment team calls the customer without having to hang up with the sales person. The enrollment team is trained to get the customer set up on the systems over the phone, grants the customer access to customer portal that includes a customer service team, a fast track portal dashboard that provides one-on-one live support/coaching chat, and access to a plurality of videos. The live support/coaching chat is on demand and is coupled with videos, which are designed to take action with a sub 30-second response time on all chats to assist the customer. The enrollment team will fulfil an order from Amazon sending the customer their welcome package such as custom gifts.

A second welcome call is placed within a predetermined time frame that has been determined to maximize the customer acceptance to further solidify the deal. Then systematic promotion of social media groups, such as Facebook® groups, are used during the start of the selling process all the way through the final week of the program. This program requires each customer to "check in" to encourage every customer to participate in the social media group. The social media groups are intentionally promoted to include purposeful placement of key information and announcements so that the customer has to be involved to stay on top of the training and new sales products. That is, there is purposeful announcement of developments, new products, and the like that are posted to the social media groups to entice recurring use by the customer. As such, because it is known that customers gravitate towards anything new, the social media groups are kept fresh and continues to welcome new members to the group. Further, strategies are provided to the customers to encourage and lift up those who are participating the most and live streams are hosted directly within the groups and posting the livestream schedule in the groups.

Further, during the training, customer self report scores, winch is in turn formatted and displayed in the social media group are posted and may be complied into a customer recognition or a "Wall of Fame" that highlights the highest customer achiever's. The posted customer recognition includes biographies of the successful customers and link each scoreboard results so that all customer may see each individual results over time. The scoreboard keeps a real time online account of every success story that is posted in the student groups, which motivates other customers to continually post their progress, not just when they have a good day or month.

As used herein a "bonafide lead" means a potential customer who has been screened and meets a plurality of predetermined requirements and has interest in a particular sales product. For example, the bonafide lead may be over 18 years of age and have a predetermined amount of discretionary income to invest in a certain sales training or particular sales product. Further, the bonafide lead may have already been introduced to the sales item via a variety of methods including video sales letters and the like.

As used herein a "customer" means a bonafide lead that is converted into a paying customer of a particular product or service. For example, a paying student of a training product.

Further, it should be appreciated that the systems and methods for determining a potential lead and establishing a bonafide lead from the potential lead and other systems and methods are described in U.S. patent application Ser. No. 17/025,678, which is hereby incorporated by reference in its entirety.

Various systems and methods that provide a sales service to improve sales while minimizing refunds and lost sales by generating and maintaining a customer relationship, which thus improves customer satisfaction are described in detail herein.

Referring now to the drawings, FIG. 1 depicts an illustrative computing network that depicts components for a system 100 for interacting with bonafide lead to generate and maintain a customer, according to embodiments shown and described herein. As illustrated in FIG. 1, a computer network 101 may include a wide area network (WAN), such as the internet, a local area network (LAN), a mobile communications network, a public service telephone network (PSTN) a personal area network (PAN), a metropolitan area network (MAN), a virtual private network (VPN), and/or another network. The computer network 101 may generally be configured to electronically connect one or more computing devices and/or components thereof. Illustrative computing devices may include, but are not limited to, a customer computing device 102a, an interface device 102b, a sales team computing device 102c, and an enrollment team computing device 102d.

The customer computing device 102a may generally provide an interface between a bonafide lead and, at some point, a customer, and the other components connected to the computer network 101. Thus, the customer computing device 102a may be used to perform one or more user-facing functions, such as receiving one or more inputs from the bonafide lead and/or customer or transmitting data or information such as data related to training, purchasing, and the like. More specifically, the customer computing device 102a may present the customer with a user interface that allows the customer to have access to a customer portal that includes access to a fast track portal that includes a coach chat and a plurality of videos, as well as access to view specific social media groups while requiring a "check in" to the social media groups, customer self report scores, and access to a customer recognition display.

As such, the customer computing device 102a may utilize data received from the interface device 102b and/or the sales team computing device 102c, as described in greater detail herein. The customer recognition may include biographies of the successful customers and link each scoreboard results so that all customers may see each individual customer results over time. Further, the scoreboard data is stored in real time of every success story that is posted in the social media groups, which motivates other customers to continually post their progress, not just when they have a good day or month. The components and functionality of the customer computing device 102a will be set forth in detail below.

Additionally, included in FIG. 1 is the sales team computing device 102c. In the event that the interface device 102b requires oversight, updating, or correction, the sales team computing device 102c may be configured to provide the desired oversight, updating, and/or correction. The sales team computing device 102c may also be used to input additional data into a data storage portion of the interface device 102b. Further, the sales team computing device 102c may be configured to prep the customer for an enrollment team call. The sales team computing device 102c may also be configured to assist in the systematic promotion of social media groups used during the start of the selling process all the way through the final week of the program. As such, the sales team computing device 102c may modify or change the social media groups with intentional promotions to include purposeful placement of key information and announcements so that the customer has to be involved to stay on top of the training and new sales products.

Additionally, included in FIG. 1 is the enrollment team computing device 102d. The enrollment team computing device 102d may be used to input additional data into a data storage portion of the interface device 102b. Further, the enrollment team computing device 102d may be configured to get the customer set up on the various systems, grant the customer access to a customer portal, fulfil an order from Amazon sending the customer their welcome package such as custom gifts. The fast track portal includes a 24 hour chat with coaches for one-to-one coaching, a plurality of videos, and the like, as discussed in greater detail herein.

The interface device 102b may provide access to the social media groups, assist in the systematic promotion of social media groups used during the start of the selling process, accept the modifications or changes to the social media groups with intentional promotions to include purposeful placement of key information and announcements so that the customer has to be involved to stay on top of the training and new sales products, monitor customer usage, monitor customer login and off times, and the like. As such, the interface device 102b may also determine what information is assisting customers, whether the promotions are working, assist in generating the data for the customer scoreboard and the customer recognition, and the like. The interface device 102b may also transmit information to the customer computing device 102a such that the customer computing device 102a may display the social media groups, the customer recognition, the customer's score and scoreboard, and the like. The interface device 102b may provide or transmit data to an external device, such as the customer computing device 102a, to display information such as promotional information tailored to specific customers leads that meet the similar specific characteristics and demographics. The components and functionality of the interface device 102b will be set forth in detail below.

It should be understood that while the customer computing device 102a, the sales team computing device 102c, and the enrollment team computing device 102d are depicted as personal computers and the interface device 102b is depicted as a server, these are merely examples. More specifically, in some embodiments, any type of computing device (e.g., mobile computing device, personal computer, server, and the like) may be utilized for any of these components. Additionally, while each of these computing devices is illustrated in FIG. 1 as a single piece of hardware, this is also an example. More specifically, each of the customer computing device 102a, the interface device 102b, the sales team computing device 102c, and the enrollment team computing device 102d may represent a plurality of computers, servers, databases, and the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

Figure 2A:
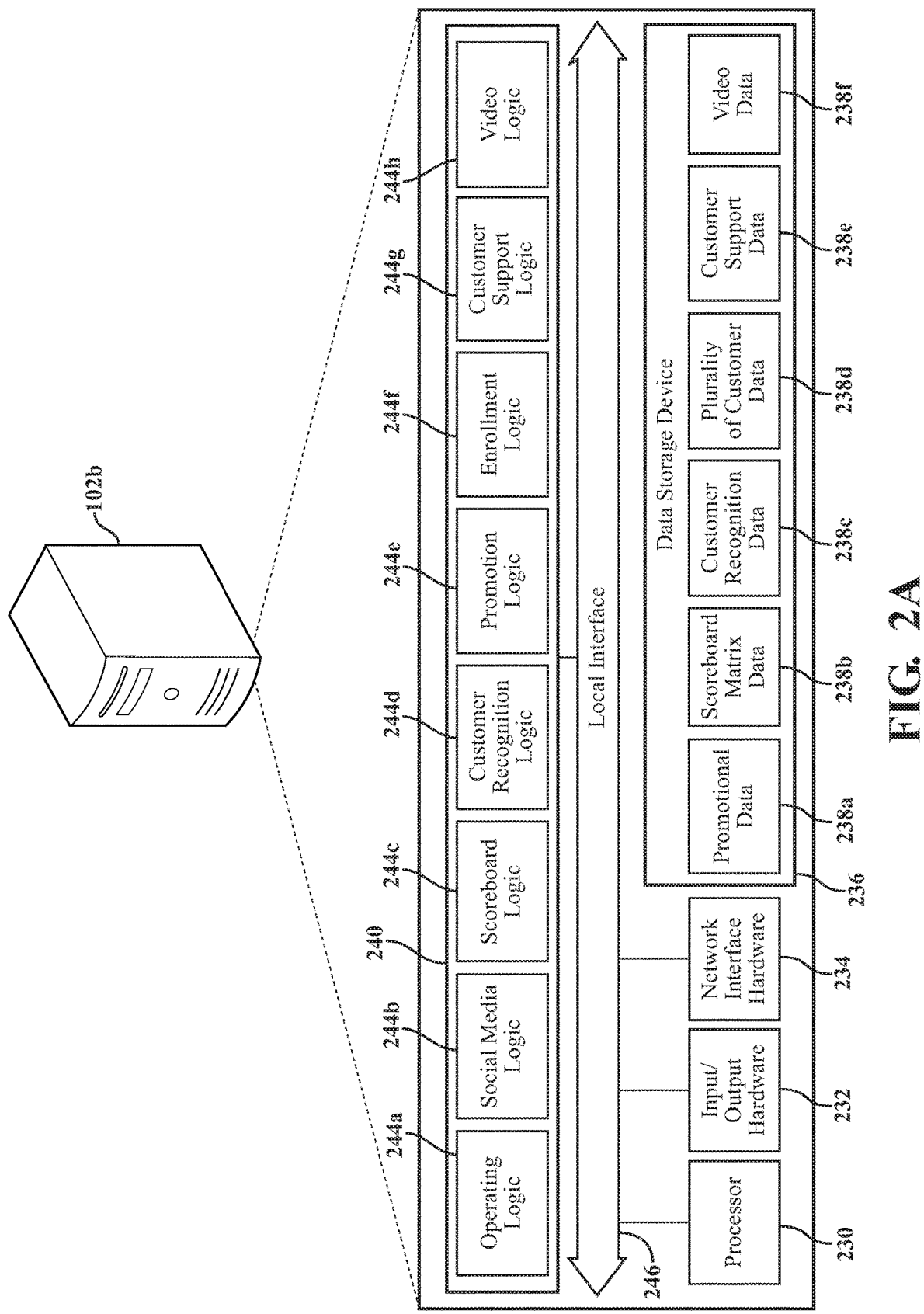
FIG. 2A schematically depicts an interface device from FIG. 1, further illustrating hardware and software components that may be used to generate and maintain a customer from a bonafide lead for a particular sales product according to one or more embodiments described and illustrated herein.

FIG. 2A depicts the interface device 102b, further illustrating a system that generates and maintains a customer from a bonafide lead for a particular sales product, such as a training program, by utilizing hardware, software, and/or firmware, according to embodiments shown and described herein. The interface device 102b may include a non-transitory, computer readable medium configured for improving customer satisfaction and reducing refunds by providing promotions and social media groups, providing scores via a scoreboard and the customer recognition, providing coaching, and/or the like, embodied as hardware, software, and/or firmware, according to embodiments shown and described herein.

While in some embodiments, the interface device 102b may be configured as a general purpose computer with the requisite hardware, software, and/or firmware, in other embodiments, the interface device 102b may be configured as a special purpose computer designed specifically for performing the functionality described herein. For example, the interface device 102b may be a specialized device that particularly identifies whether live coaching support is requested and is coupled with videos, which are designed to take action with a sub 30 second response time on all chats to assist the customer, as discussed in greater detail herein. In a further example, the interface device 102b may be a specialized device that provides and/or assist in generating data necessary for the customer scoreboard and the customer recognition.

As also illustrated in FIG. 2A, the interface device 102b may include a processor 230, input/output hardware 232, network interface hardware 234, a memory component 240, and a data storage component 236, which stores promotional data 238a, scoreboard matrix data 238b, customer recognition data 238c, a plurality of customer data 238d, a customer support data 238e, and a video data 238f. The memory component 240 may be non-transitory computer readable memory. The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. The memory component 240 may include one or more programming instructions thereon that, when executed by the processor 230, cause the processor 230 to complete various processes, such as one or more of the processes described herein with respect to FIGS. 5-10.

Additionally, the memory component 240 may be configured to store operating logic 244a, social media logic 244b, scoreboard logic 244c, customer recognition logic 244d, promotional logic 244e, enrollment logic 244f, customer support logic 244g, and video logic 244h (each of which may be embodied as a computer program, firmware, or hardware, as an example). A local interface 246 is also included in FIG. 2A and may be implemented as a bus or other interface to facilitate communication among the components of the interface device 102b. It should be understood that the processor 230, memory component 240 and various logic modules such as the social media logic 244b, scoreboard logic 244c, customer recognition logic 244d, promotional logic 244e, enrollment logic 244f and the video logic 244h may define a computer-program product for generates and maintains a customer from a bonafide lead for a particular sales product, such as a training program.

The processor 230 may include any processing component(s) configured to receive and execute instructions (such as from the data storage component 236 and/or memory component 240). The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 236 may reside local to and/or remote from the interface device 102b and may be configured to store one or more pieces of data for access by the interface device 102b and/or other components, generate and maintain a customer from a bonafide lead for a particular sales product, such as a training program. As illustrated in FIG. 2A, the data storage component 236 stores a plurality of promotional data 238a. As mentioned above, the plurality of promotional data 238a may include data related to customer check in, data related to intentionally promoted advertisements and other information and announcements, such as data related to developments, new products, and the like, to entice recurring use by the customer. Data related to live streams hosted within the groups and posting the livestream schedule in the groups. Further, additional data may include data placing high achiever customers (i.e., those with higher customer scores on the scoreboard) with other customers (i.e., those with lower customer scores on the scoreboard) to assist in raising the scores in the scoreboard of the other customers.

The scoreboard matrix data 238b stores data related to individual customer scores such as product sales over a predetermined period, a numerical percentage for product sales over a predetermined period, and the like, as discussed in greater detail herein. The individual customer scores may be self reported and/or automatically gathered from other data files, such as a master excel sheet, external websites, external databases, and the like. The individual customer scores may be formatted and saved in the scoreboard matrix data 238b. Each scoreboard of the plurality of customer scoreboards stored in the scoreboard matrix data 238b may include biographic data about the particular customer such as name, age, and score matrix information. Further, the scoreboard matrix data 238b stores a real time online account of every success story of each customer that is posted in the groups, as described herein with respect to FIG. 3A.

The customer recognition data 238c may include data of a plurality of customers scores via the scoreboards that are formatted and complied such that several days or weeks' worth of scores are available. Further, each of the plurality of customer's scoreboards may be sorted and saved in an order to identify the most successful customers to form the customer recognition, as described herein with respect to FIG. 3B. Further, the customer recognition data 238c may include data related to links to redirect any customer to each individual scoreboard results of the customer's in the customer recognition so that all customers may see each individual customer's results over time.

The plurality of customer data 238d may include data related to the biographic data of each customer. Further, the demographic and/or characteristic data of each customer may be stored. For example data related to where the products are sold, the area of the country they are from, and the like. The customer support data 238e may include data related to specific videos and chat data to communication between customers, between coaches, support staff, and the like. For example, the customer support data 238e may include self-help videos, videos of other customers, and the like, that provide guidance on the training materials.

The video data 238f may include data relating to the specific videos that are automatically played once it is determined whether the potential lead qualifies as a bonafide lead or is directed to the alternative sales packages. As such, the data stored may include data for a plurality of different videos that each include different content. For example, one video may be intended to reinforce the sales relationship for the bonafide lead while another video may be intended to continue to sell the product and inform the potential lead of alternative products that may meet their specific situation (i.e., money to invest) and this provides motivation to continue and if, possible, spend more for the full product, but if not, still close the sale for an alternative sales product from the potential lead.

Further, the video data 238f may include data related to the recorded name of the biographic data of each customer. That is, the video data 238f may include data as to the name of the recipient of the video and a plurality of data related to every name and variant of name to match a saved recorded name to that of the recipient. For example, the name "Erin" may be recorded only once and used whenever the recipient of the first or second video name is "Erin". Further variants of "Erin" are automatically determined to automatically be added to the video. Such variants may include, for example, "Erinn", "Arryn", "Arron". "Aaron", "Aron" and the like. As such, only a root name needs to be recorded one time and the system will recognize the variant and initiate the video with the prerecorded name to customize or personalize each video regardless of whether the video is the first or second thank you video.

Included in the memory component 240 are the operating logic 244a, the social media logic 244b, the scoreboard logic 244c, the customer recognition logic 244d, the promotional logic 244e, the enrollment logic 244f, the customer support logic 244g and the video logic 244h. The operating logic 244a may include an operating system and/or other software for managing components of the interface device 102b. The social media logic 244b may contain programming instructions to facilitate and/or elicit responses from each customer within the social medial groups, as described in greater detail herein. The social media logic 244b may use known or unknown social medial platforms to provide a meeting or group setting. Further, the social media logic 244b may contain programming instructions that require a check in by each customer at predetermined intervals that may vary depending on the stage of training of the customer, the scoreboard ranking, and/or the like.

The scoreboard logic 244c may contain programming instructions to gather scoreboard data in real time for every customer and determine a score for each customer. Further, scoreboard logic 244c may contain programming instructions to format and display in the social media group the scores of every customer on their respective scoreboard.

The customer recognition logic 244d may contain programming instructions to interpret, sort, gather, and the like the scores of each customer and which customers meet a predetermined criteria for highlighting or recognition on the social medial platform within the group. For example, predetermined criteria may include determining the most successful for customers based on scores over a predetermined period (e.g., for 1 month, 6 months, annually, and the like), the determine the most successful customers, success stories based on improvement (e.g., day over day, week over week, month or month, and the like), and/or the like. It should be appreciated that these success stories are posted in the social media groups, which motivates other customers to continually post their progress, not just when they have a good day or month.

The promotional logic 244e may contain programming instructions to intentionally promote and purposeful placement of key information and announcements so that each customer is enticed to login to the group page on a regular frequency. For example, the regular frequency may be at least every day, twice a day, every hour, and the like. As such, each customer is involved to stay on top of the training and new sales products. That is, there is purposeful announcement of developments, new products, and the like that are posted to the social media groups to entice recurring use by the customer. As such, because it is known that customers naturally gravitate towards anything new, the social media groups are kept fresh and continue to welcome new customers to the group. Further, the promotional logic 244e may contain programming instructions to provide live streams that are hosted directly within the social media groups and posting the livestream schedule in the groups.

The enrollment logic 244f may contain programming instructions to automatically alert an enrollment team member during an initial sales call with the now customer to provide the customer with all the data needed to join the social media groups. The customer support logic 244g may contain programming instructions to automatically connect the customer computing device 102a with the interface device 102b, the sales team computing device 102c and/or the enrollment team computing device 102d to provide a plurality of chat options, video help and the like.

The video logic 244h may contain programming instructions to determine the name of the potential lead and/or bonafide lead and automatically retrieve from the database, such as the video data 238f, the recorded name of the potential lead and/or bonafide lead to customize or personalize videos that are sent to the potential lead and/or bonafide lead. As such, it should be appreciated that there may be multiple videos that are sent based on the status of the user. That is, if the user is qualified as a bonafide lead, one set of customized or personalized videos may be sent. If the user is not qualified as a bonafide lead, then alternative personalized or customized videos are sent to the user. As such, the videos for the bonafide lead reinforce the sales relationship for the bonafide lead and the other videos may intend to continue to sell the product and inform the potential lead of alternative products that may meet their specific situation (i.e., money to invest) and provides motivation to continue and if, possible, spend more money for the full product, but if not, still close the sale for an alternative sales product from the potential lead.

Further, the content of each video to the bonafide lead is exactly the same, but the introduction which includes the name of the recipient is changed to match the name of the bonafide lead. The content of each video to the non-bonafide lead is exactly the same, but the introduction which includes the name of the recipient is changed to match the name of the potential lead.

The video logic 244h may contain programming instructions to determine and/or recognizes the name of the recipient of the videos and variants thereof to match a saved recorded name to that of the recipient. For example, the name "Erin" may be recorded only once and used whenever the recipient of the video name is "Erin". Further variants of "Erin" are automatically determined to automatically be added to the video. Such variants may include, for example, "Erinn", "Arryn", "Arron". "Aaron", "Aron" and the like. As such, only a root name needs to be recorded one time and stored as video data 238f and the video logic 244h and/or other components of the interface device 102b will recognize the variant and initiate the video with the prerecorded name to customize or personalize each video regardless of whether the video is intended for the bonafide lead or the potential lead.

It should be understood that the components depicted in FIG. 2A are merely illustrative and are not intended to limit the scope of this disclosure. More specifically, while the components in FIG. 2A are illustrated as residing within the interface device 102b, this is a non-limiting example. In some embodiments, one or more of the components may reside external to the interface device 102b. Similarly, while FIG. 2A is directed to the interface device 102b, other components such as the customer computing device 102a, the sales team computing device 102c, and the enrollment team computing device 102d may include similar hardware, software, and/or firmware.

FIG. 2B depicts the customer computing device 102a further illustrating a system that interacts with the interface device 102b to generate and maintain a customer from a bonafide lead for a particular sales product, such as a training program, by utilizing hardware, software, and/or firmware, according to embodiments shown and described herein. In addition, the customer computing device 102a may include a non-transitory, computer readable medium configured for displaying and transmitting data initiated by the customer embodied as hardware, software, and/or firmware, according to embodiments shown and described herein.

While, in some embodiments, the customer computing device 102a may be configured as a general purpose computer with the requisite hardware, software, and/or firmware, in other embodiments, the customer computing device 102a may be configured as a special purpose computer designed specifically for performing the functionality described herein. For example, the customer computing device 102a may be a specialized device that displays a user interface for inputting and viewing the social media groups, the promotions, the customer support portal such as the scoreboard and the customer recognition, a fast track portal that provides coaching chat support and videos, and/or the like, as discussed in greater detail herein.

As also illustrated in FIG. 2B, the customer computing device 102a may include a processor 270, input/output hardware 272, network interface hardware 274, data storage component 276, which stores a database of selection data 278a and display data 278b, and a memory component 280. The memory component 280 may be non-transitory computer readable memory. The memory component 280 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components.

The memory component 280 may include one or more programming instructions thereon that, when executed by the processor 270, cause the processor 270 to complete various processes, such as one or more of the processes described herein with respect to FIGS. 5-10. Additionally, the memory component 280 may be configured to store operating logic 282a, selection logic 282b, and display logic 282c (each of which may be embodied as a computer program, firmware, or hardware, as an example). A local interface 284 is also included in FIG. 2B and may be implemented as a bus or other interface to facilitate communication among the components of the customer computing device 102a.

The processor 270 may include any processing component(s) configured to receive and execute instructions (such as from the data storage component 276 and/or memory component 280). The input/output hardware 272 may include a monitor, keyboard, mouse, printer, camera, microphone, speaker, and/or other device for receiving, sending, and/or presenting data. The network interface hardware 274 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 276 may reside local to and/or remote from the customer computing device 102a and may be configured to store one or more pieces of data for access by the customer computing device 102a and/or other components, store data that may be received from an external device (e.g., the interface device 102b) such as the selection data 278a, and/or store data to be displayed. As illustrated in FIG. 2B, the data storage component 276 stores a database of selection data 278a. As mentioned above, the selection data 278a may include data related to a selection such as a social media group selection, promotional video selection, requested coaching chat support, and the like, and/or data received from an external device (i.e., the interface device 102b). The display data 278b may include data relating to the data to be displayed. For instance, the display data 278b may include the type of social media group to be displayed on the customer computing device 102a, a plurality of videos, scoreboard, customer recognition, and the like, which may be in the form of several webpages received from the interface device 102b.

Included in the memory component 280 are the operating logic 282a, selection logic 282b, and display logic 282c. The operating logic 282a may include an operating system and/or other software for managing components of the customer computing device 102a. The selection logic 282b may contain programming instructions to facilitate customer initiated electronic selections. The selection logic 282b may be configured to compile, organize, transmit, and/or display the customer choices or selections to into an order, such that the interface device 102b may analyze the customer choices and/or selections and/or such that the sales team computing device 102c and/or the enrollment team computing device 102d may receive the customer choices and/or selections. The selection logic 282b may be configured to provide data for a user interface to display or a display device of the customer computing device 102a.

The display logic 282c may display a graphical user interface usable by the customer of the customer computing device 102a to provide choices and/or selections, to display visualizations of a plurality of metadata associated with the selected choices, and to display the result of the metadata associated with the selected choices. The display logic 282c may generally be configured to display information on a display of the customer computing device 102a. The functionalities of the operating logic 282a, the selection logic 282b, and the display logic 282c will be described in further detail below.

It should be understood that the components depicted in FIG. 2B are merely illustrative and are not intended to limit the scope of this disclosure. More specifically, while the components in FIG. 2B are illustrated as residing within the customer computing device 102a, this is a non-limiting example. In some embodiments, one or more of the components may reside external to the customer computing device 102a. Similarly, while FIG. 2B is directed to the customer computing device 102a, other components such as the sales team computing device 102c and/or the enrollment team computing device 102d may include similar hardware, software, and/or firmware.

Figure 2C:
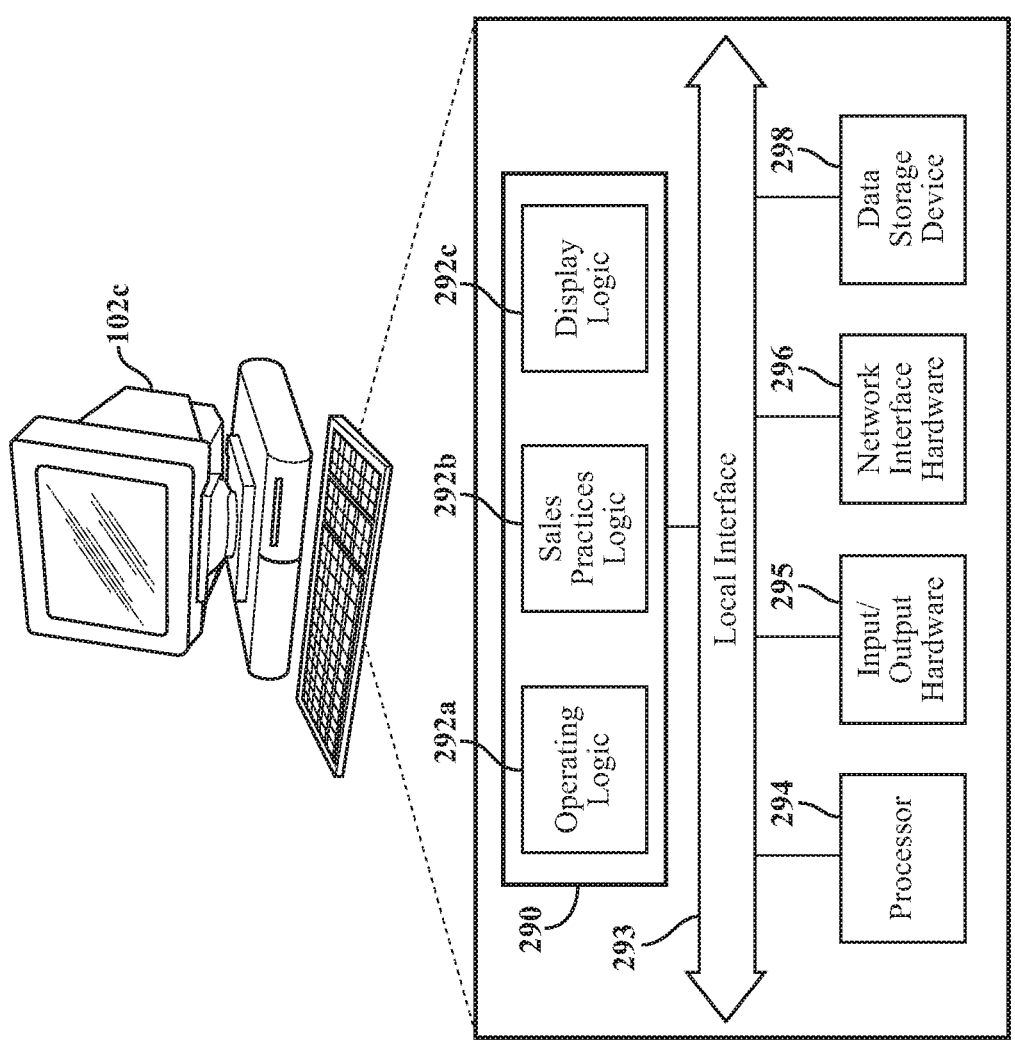
FIG. 2C schematically depicts a sales member computing device from FIG. 1, further illustrating hardware and software components that may be used to generate and maintain a customer from a bonafide lead for a particular sales product according to one or more embodiments described and illustrated herein.

FIG. 2C depicts the sales team computing device 102c further illustrating a system that interacts with the interface device 102b to generate and maintain a customer from a bonafide lead for a particular sales product, such as a training program, by utilizing hardware, software, and/or firmware, according to embodiments shown and described herein. In addition, the sales team computing device 102c may include a non-transitory, computer readable medium configured for displaying and transmitting a data initiated by a customer embodied as hardware, software, and/or firmware, according to embodiments shown and described herein.

While, in some embodiments, the sales team computing device 102c may be configured as a general purpose computer with the requisite hardware, software, and/or firmware, in other embodiments, the sales team computing device 102c may be configured as a special purpose computer designed specifically for performing the functionality described herein. For example, the sales team computing device 102c may be a specialized device that displays scripts to generate and maintain a customer from a bonafide lead for a particular sales product, and the like, as discussed in greater detail herein.

As also illustrated in FIG. 2C, the sales team computing device 102c may include a processor 294, input/output hardware 295, network interface hardware 296, data storage device 298, and a memory component 290. The memory component 290 may be non-transitory computer readable memory. The memory component 290 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. The memory component 290 may include one or more programming instructions thereon that, when executed by the processor 294, cause the processor 294 to complete various processes, such as one or more of the processes described herein with respect to FIGS. 5-10. Additionally, the memory component 290 may be configured to store operating logic 292a, sales practices logic 292b, and display logic 292c (each of which may be embodied as a computer program, firmware, or hardware, as an example). A local interface 293 is also included in FIG. 2C and may be implemented as a bus or other interface to facilitate communication among the components of the sales team computing device 102c.

The processor 294 may include any processing component(s) configured to receive and execute instructions (such as from the data storage device 298 and/or memory component 290). The input/output hardware 295 may include a monitor, keyboard, mouse, printer, camera, microphone, speaker, and/or other device for receiving, sending, and/or presenting data. The network interface hardware 296 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage device 298 may reside local to and/or remote from the sales team computing device 102c and may be configured to store one or more pieces of data for access by the sales team computing device 102c and/or other components, store data that may be received from an external device (e.g., the interface device 102b) such as the plurality of customer data 238d, promotional data 238a, and/or store data to be displayed.

The data storage device 298 may stores data related to each customer, data related to the promotions, the scoreboard of each customer the customer recognition, and the like. Included in the memory component 290 are the operating logic 292a, sales practices logic 292b, and display logic 292c. The operating logic 282a may include an operating system and/or other software for managing components of the sales team computing device 102c. The sales practices logic 292b may contain programming instructions to facilitate scripts and other proven methods of customer retention while minimizing refunds. As such, the sales practices logic 292b may be configured to compile, organize, transmit, and/or display the scripts or selections based on the particular customer, situation, and the like, into an order, such that the interface device 102b and/or the sales team computing device 102c may analyze the choices and/or selections to provide the appropriate script for the sales team member to follow via the display of the sales team computing device 102c. It should be appreciated that similar situations for different customers (i.e., different scores of the scoreboard) may elicit different scripts. The sales practices logic 292b may be configured to provide data for the user interface to display or a display device of the sales team computing device 102c.

The display logic 292c may display a graphical user interface usable by a user of the sales team computing device 102c to provide the script choices and/or selections, to display visualizations of a plurality of scripts associated with the selected choices, and to display the result of the scripts with the selected choices. The display logic 292c may generally be configured to display information on a display of the sales team computing device 102c. The functionalities of the operating logic 292a, the sales practices logic 292b, and the display logic 292c will be described in further detail below.

It should be understood that the components depicted in FIG. 2C are merely illustrative and are not intended to limit the scope of this disclosure. More specifically, while the components in FIG. 2C are illustrated as residing within the sales team computing device 102c, this is a nonlimiting example. In some embodiments, one or more of the components may reside external to the sales team computing device 102c. Similarly, while FIG. 2C is directed to the sales team computing device 102c, other components such as the customer computing device 102a and the enrollment team computing device 102d may include similar hardware, software, and/or firmware.

Figure 2D:
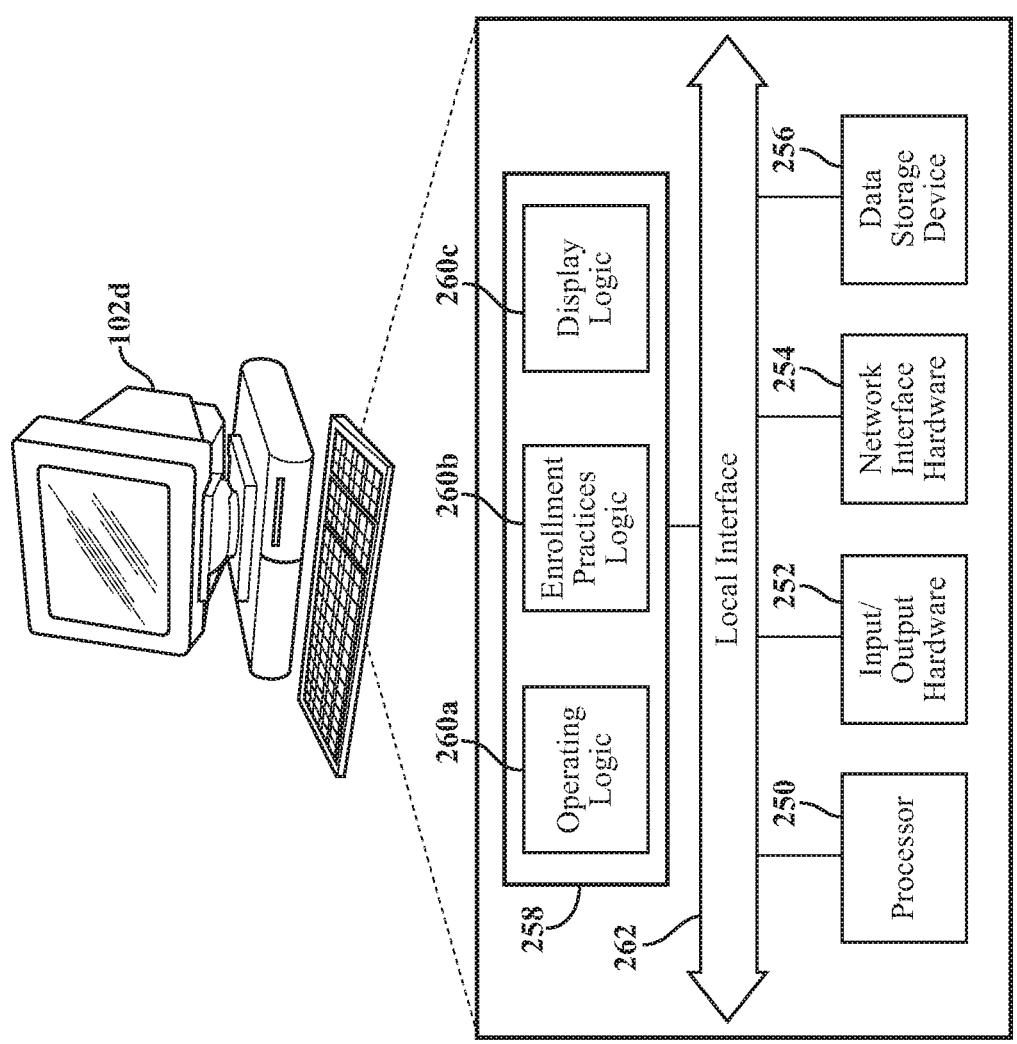
FIG. 2D schematically depicts an enrollment member computing device from FIG. 1, further illustrating hardware and software components that may be used to generate and maintain a customer from a bonafide lead for a particular sales product according to one or more embodiments described and illustrated herein.

FIG. 2D depicts the enrollment team computing device 102d further illustrating a system that interacts with the interface device 102b to generate and maintain a customer from a bonafide lead for a particular sales product, such as a training program, by utilizing hardware, software, and/or firmware, according to embodiments shown and described herein. In addition, the enrollment team computing device 102d may include a non-transitory, computer readable medium configured for displaying and transmitting a data initiated by an enrollment user embodied as hardware, software, and/or firmware, according to embodiments shown and described herein.

While, in some embodiments, the enrollment team computing device 102d may be configured as a general purpose computer with the requisite hardware, software, and/or firmware, in other embodiments, the enrollment team computing device 102d may be configured as a special purpose computer designed specifically for performing the functionality described herein. For example, the enrollment team computing device 102d may be a specialized device that connects with the customer and the sales team to on-board the customer, as discussed in greater detail herein. In some embodiments, the connection between the customer and the sales team is performed using Slack®.

As also illustrated in FIG. 2D, the enrollment team computing device 102d may include a processor 250, input/output hardware 252, network interface hardware 254, data storage device 256, and a memory component 258. The memory component 258 may be non-transitory computer readable memory. The memory component 258 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. The memory component 258 may include one or more programming instructions thereon that, when executed by the processor 250, cause the processor 250 to complete various processes, such as one or more of the processes described herein with respect to FIGS. 5-10. Additionally, the memory component 258 may be configured to store operating logic 260a, enrollment practices logic 260b, and display logic 260c (each of which may be embodied as a computer program, firmware, or hardware, as an example). A local interface 262 is also included in FIG. 2D and may be implemented as a bus or other interface to facilitate communication among the components of the enrollment team computing device 102d.

The processor 250 may include any processing component(s) configured to receive and execute instructions (such as from the data storage device 256 and/or memory component 258). The input/output hardware 252 may include a monitor, keyboard, mouse, printer, camera, microphone, speaker, and/or other device for receiving, sending, and/or presenting data. The network interface hardware 254 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage device 256 may reside local to and/or remote from the enrollment team computing device 102d and may be configured to store one or more pieces of data for access by the enrollment team computing device 102d and/or other components, store data that may be received from an external device (e.g., the interface device 102b) such as the plurality of customer data 238d, promotional data 238a, and/or store data to be displayed.

The data storage device 256 may store data related to each customer, data related to the onboarding process to improve customer satisfaction and reduce refunds, and the like. Included in the memory component 290 are the operating logic 260a, enrollment practices logic 260b, and display logic 260c. The operating logic 260a may include an operating system and/or other software for managing components of the enrollment team computing device 102d. The enrollment practices logic 260b may contain programming instructions to facilitate or connect the enrollment team during the sales team call such that the customer does not hang up on the sales call. In some embodiments, the connection between the sales team, the enrollment team and the customer is via Slack®.

Further, the enrollment practices logic 260b may contain programming instructions to provide scripts to the enrollment team to setup the customer on the various systems, grant the customer access to the customer support portal and fast track portal, book a welcome call and the like. As such, the enrollment practices logic 260b may be configured to compile, organize, transmit, and/or display the scripts or selections based on the particular customer, situation, and the like, into an order, such that the interface device 102b and/or the enrollment team computing device 102d may analyze the choices and/or selections to provide the appropriate script for the sales team member to follow via the display of the enrollment team computing device 102d. The enrollment practices logic 260b may be configured to provide data for the user interface to display or a display device of the enrollment team computing device 102d.

The display logic 260c may display a graphical user interface usable by a user of the enrollment team computing device 102d to provide the script choices and/or selections, to display visualizations of a plurality of scripts associated with the selected choices, and to display the result of the scripts with the selected choices. The display logic 260c may generally be configured to display information on a display of the enrollment team computing device 102d. The functionalities of the operating logic 260a, the enrollment practices logic 260b, and the display logic 260c will be described in further detail below.

It should be understood that the components depicted in FIG. 2D are merely illustrative and are not intended to limit the scope of this disclosure. More specifically, while the components in FIG. 2D are illustrated as residing within the enrollment team computing device 102d, this is a non-limiting example. In some embodiments, one or more of the components may reside external to the sales team computing device 102c. Similarly, while FIG. 2D is directed to the enrollment team computing device 102d, other components such as the customer computing device 102a may include similar hardware, software, and/or firmware.

Figure 3A:
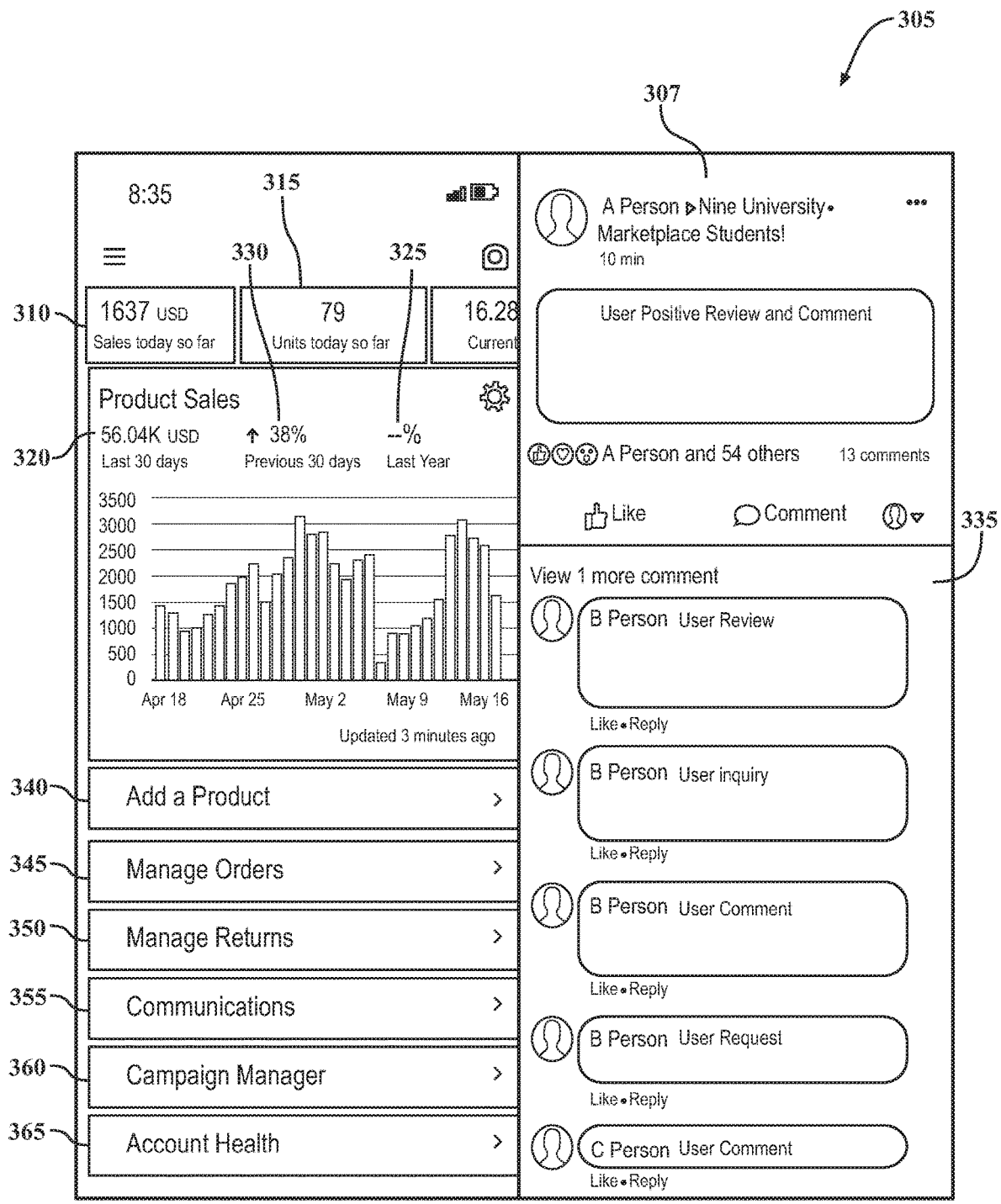
FIG. 3A schematically depicts a customer scoreboard according to one or more embodiments described and illustrated herein.

FIG. 3A schematically depicts a scoreboard dashboard 305. The scoreboard dashboard 305 may include a customer identifier 307, an amount of daily sales 310, an amount of daily units sold 315, product sales over a predetermined period 320, a comment section 335, and a general sales management section 340.

The customer identifier 307 may include information about the customer such as the customer's name, site where products are sold, country products are sold in, and the like. The product sales over a predetermined period 320 may include a numerical and graphical representation. Further, the predetermined period may be 30 days, in some embodiments. In other embodiments, the predetermined period may be less or more than 30 days. Further, the product sales over a predetermined period 320 may include a numerical percentage for product sales over the last 30 days 325 and the last year 330. The numerical percentage for product sales over the last 30 days 325 and the last year 330 may be color coded for an increase in green and a decrease in red for visual effect.

Further, in some embodiments, the general sales management section 340 may include various links and tabs, such as a product link, a manage orders link a manage returns link, a communications link, a campaign manager link, an account health link, and/or the like.

Figure 3B:
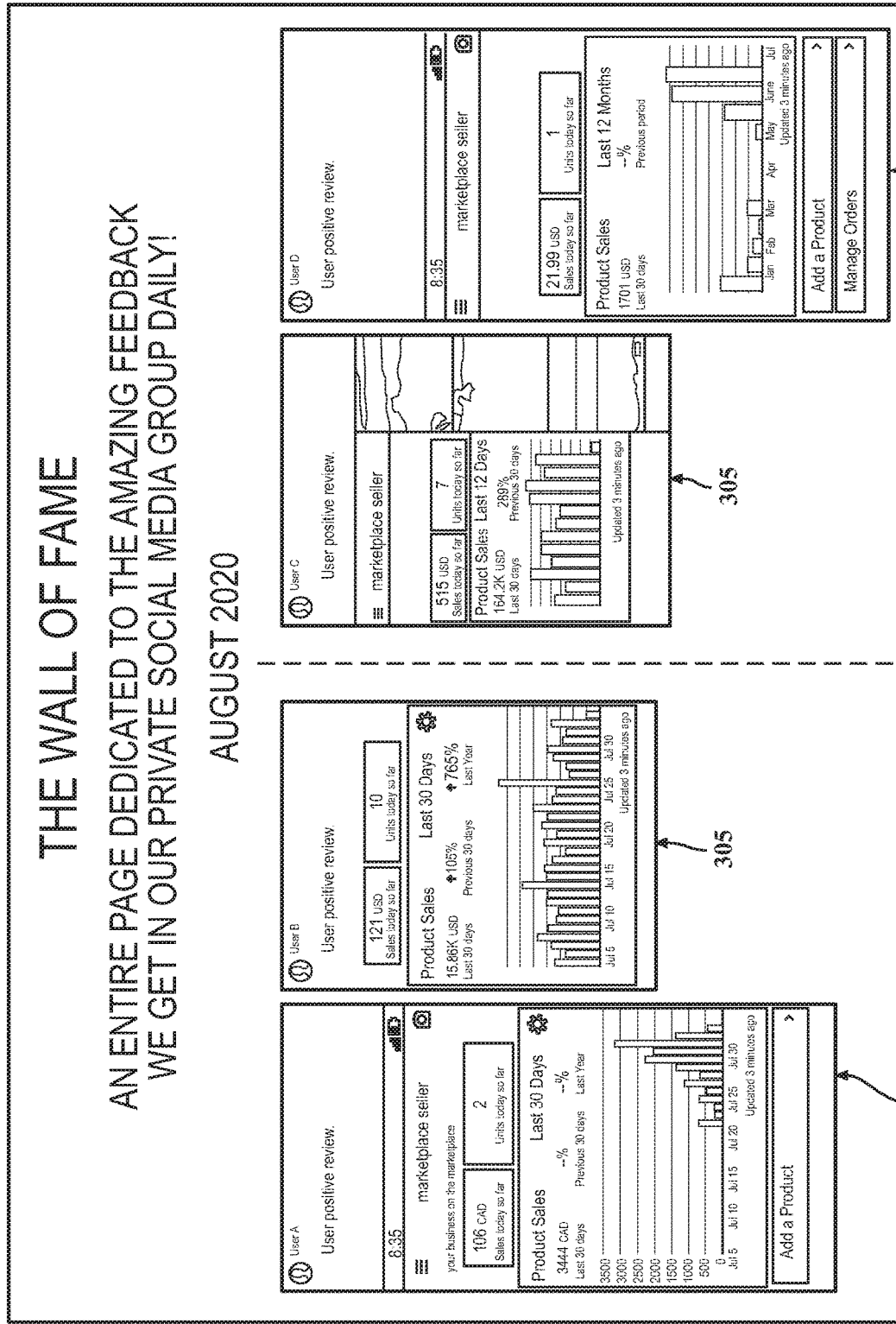
FIG. 3B schematically depicts a customer recognition dashboard according to one or more embodiments described and illustrated herein.

FIG. 3B schematically depicts a customer recognition dashboard 370. The customer recognition dashboard 370 is a display of the top, highest or best scoreboard dashboards 305 for a predetermined amount of time. For example, the customer recognition dashboard 370 may be a collection of and display the top ten scoreboards of the customers for the last month on a real, or live data feed. That is, during the month, the top ten scoreboards may change and so is the displayed scoreboards. In another example, the customer recognition dashboard 370 may be a collection of and display more or less than 10 scoreboards and the rating of each scoreboard may vary. For example, the rating may be based on product sales over a predetermined period, the numerical percentage for product sales over the last 30 days, the last year, and the like. Further, the customer recognition dashboard 370 may be a collection of and display scoreboards based on time periods less than or greater than 30 days.

FIG. 4 schematically depicts an overview dashboard 405 of the fast track portal 400. The overview dashboard 405 may include a video section 410 and a chat section 415. The overview dashboard 405 may be customizable based on the type of product purchased. That is, different access to the fast track portal 400 may be by an additional fee. As such, the video section 410 and the chat section 415 may have different looks, graphics, and/or may not be present based on the level of access of the fast track portal 400. Further, the fast track portal 400 includes coaching from members that have completed the training and are amongst the top scores of \n the scoreboard. That is, in order to qualify as a fast track coach, one must generate a certain money figure with their business or demonstrate expert level knowledge in the subject matter based on the provided training program. As such, the coaches are elite and provide positive reinforcement to improve a cohesive team. The chat functionality may be available 24 hours a day. In some embodiments, a messaging platforms may be used to connect the customer to the coach. For example, Tawk.to® may be used.

Due to the number of coaches versus students, the wait time for chat coaching is less than 30 seconds. In some embodiments, the wait time is between 12 and 20 seconds. In other embodiments, the wait time is greater than 30 seconds. As such, it should be appreciated that the wait time for one-to-one coaching is almost instantaneous. As such, it should be appreciated that the fast track portal 400 provides increased morale amongst the customers and the coaches. As such, business strategies and the like may be presented and tweaked by coaches who have several completion of the business top make the customer and the coach more successful. Further, access to the fast track portal is provided for a predetermined period of time to all new customers. For example, a 14 day trail period. As such, the each new customer is provided with one-to-one coaching right away to assist each student in setting each customer for success in the program. Further, this reduces refund rates. Once the customer has experienced and absorbed 14 days of content and become familiar with the community/live-stream culture, each customer is much more likely to stay and have a positive experience with the training. Further, the trail period provides each new customer an experience with the fast track portal 400. As such, the fast track portal 400 requires minimal marketing.

Figure 5:
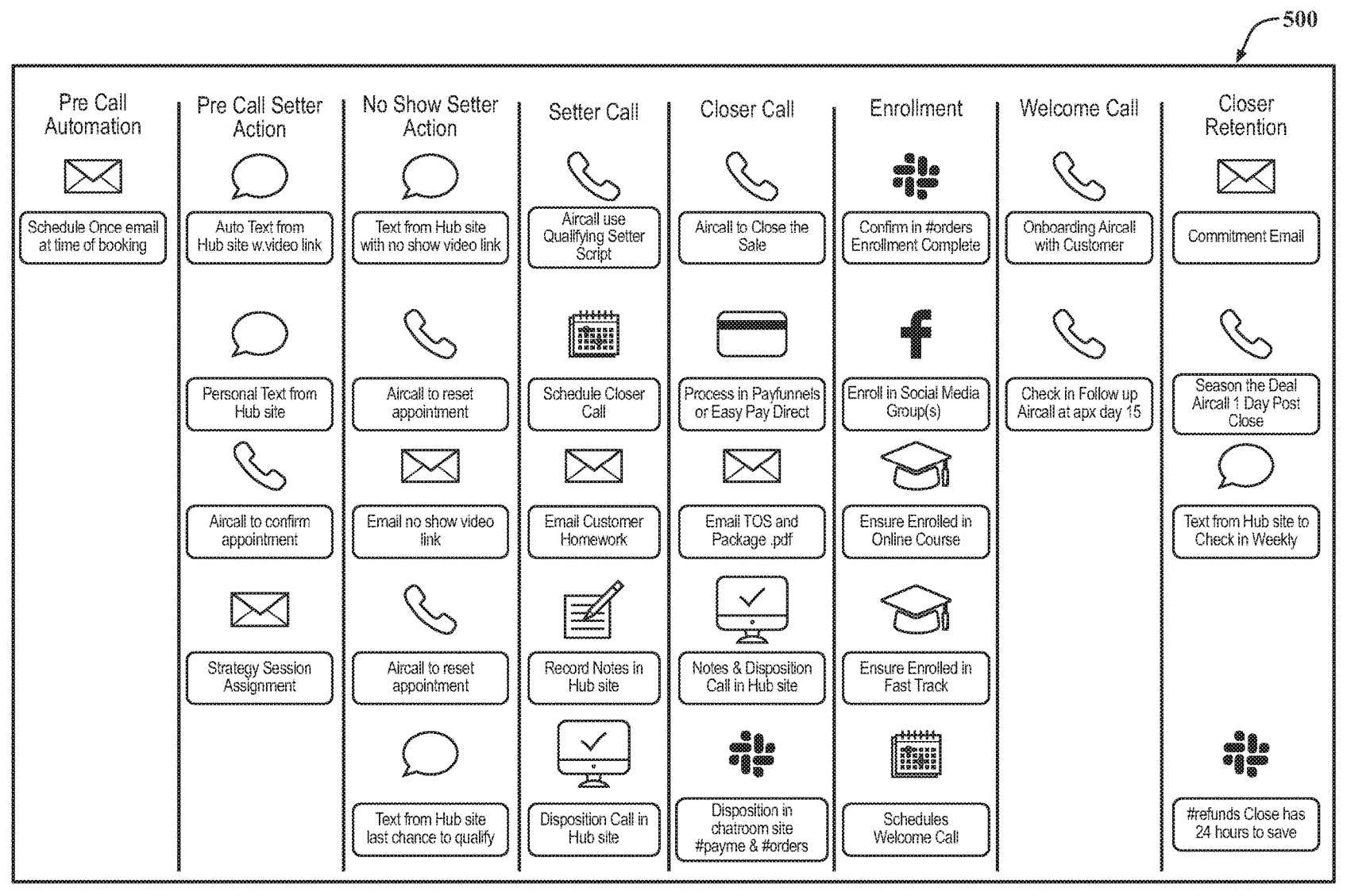
Figure 6:
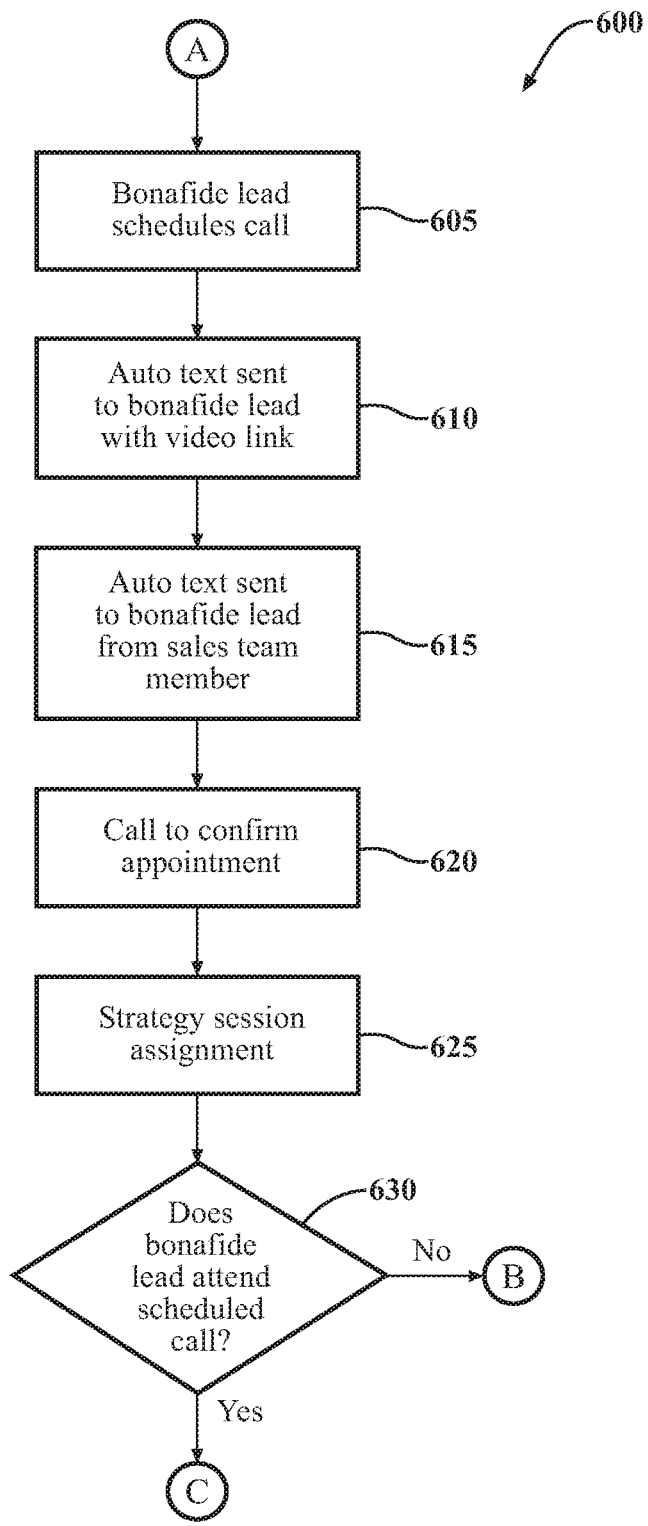
FIG. 6 depicts a flow diagram of an illustrative method of a pre-call setter portion of the sales process of FIG. 5 according to one or more embodiments shown and described herein.

Referring now to FIGS. 5-6, in which FIG. 5 is an overview of the sales process 500 and FIG. 6 is a flow diagram that graphically depicts an illustrative method 600 of a pre-call setter portion of the sales process 500 is provided. Although the steps associated with the blocks of FIG. 6 will be described as being separate tasks, in other embodiments, the blocks may be combined or omitted. Further, while the steps associated with the blocks of FIG. 5 will described as being performed in a particular order, in other embodiments, the steps may be performed in a different order.

As shown in FIG. 6, the method 600 may begin when a bonafide lead schedules a call, at block 605. The schedule of the call may be automated and may only be permitted for those bonafide leads who already met specific minimum requirements and who are interested in the specific sales product. At block 610, an automatic text is sent to the bonafide lead with a video link. In some embodiments, the video link may contain information about the sales product in order to continue to entice the bonafide lead into moving forward in the sales process 500. For example, the video link may provide motivation and encouragement concerning why the sales product, such as a training program, is superior to others. It may contain testimonials and other encouraging promotions. At block 615, an automatic text is sent to the bonafide lead from the assigned sales team member. In some embodiments, the text may contain information regarding the assigned sales team member such as an introduction and other information. At block 620, an initial call is made to the bonafide lead to confirm the appointment. The initial call may be Aircall®, or other cloud initiated call, and may be from any team member of the sales team, enrollment team, and the like.

At block 625, a strategy session assignment is completed. The strategy session may be a sales call between the bonafide lead and the setter to diagnose whether the bonafide lead is a good fit for the sales program. For example, because of the scoreboard and other social media disclosures, the bonafide lead needs to be motivated and fit the predetermined criteria to be asked to join the program. At block 630, a determination is made whether the bonafide lead attended the schedule call. If the bonafide lead did not attend the call, at block 630, then the sales process 500 continues to the method 700 as graphically depicted in FIG. 7. If the bonafide lead did attend the call, at block 630, then the sales process 500 continues to the method 800 as graphically depicted in FIG. 8.

Figure 7:
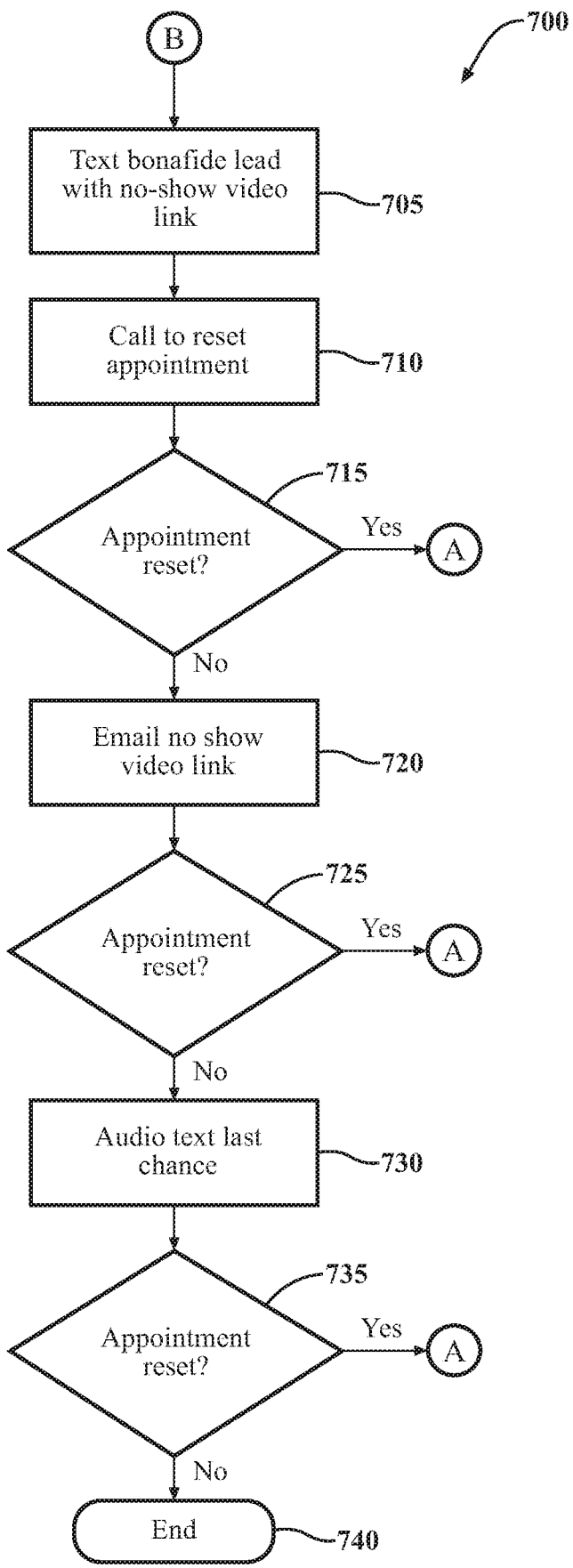
FIG. 7 depicts a flow diagram of an illustrative method of a no show setter action portion of the sales process of FIG. 5 according to one or more embodiments shown and described herein.

Referring now to FIGS. 5 and 7, in which FIG. 7 is a flow diagram that graphically depicts an illustrative method 700 of a no show setter action portion of the sales process 500 is provided. Although the steps associated with the blocks of FIG. 7 will be described as being separate tasks, in other embodiments, the blocks may be combined or omitted. Further, while the steps associated with the blocks of FIG. 7 will described as being performed in a particular order, in other embodiments, the steps may be performed in a different order.

A text message is sent to the bonafide lead that includes a no-show video link, at block 705. In some embodiments, the no-show video link may contain information about the sales product in order to convince or entice the bonafide lead into moving forward in the sales process 500. For example, the video link may provide motivation and encouragement concerning why the sales product, such as a training program, is superior to others. It may contain testimonials and other encouraging promotions. A reschedule call may be placed using Aircall®, or another cloud initiated call, and may be from any team member of the sales team, enrollment team, and the like, at block 710. A determination is made as to whether the bonafide lead reschedules the call, at block 715. If the bonafide lead reschedules the call, then the sales process 500 continues to the method 600 as graphically depicted in FIG. 6. If the bonafide lead does not reschedule the call, then an email is sent to the bonafide lead that includes a no-show video link, at block 720. In embodiments, the no-show video link may contain information about the sales product in order to convince or entice the bonafide lead into moving forward in the sales process 500. For example, the video link may provide motivation and encouragement concerning why the sales product, such as a training program, is superior to others. It may contain testimonials and other encouraging promotions.

Following the email of the no-show video link, at block 720, a determination is made as to whether the bonafide lead reschedules the call, at block 725. If the bonafide lead reschedules the call, then the sales process 500 continues to the method 600 as graphically depicted in FIG. 6. If the bonafide lead does not reschedule the call, then an automatic text is sent to the bonafide lead that advises the bonafide lead that this is a last chance to qualify for the sales product, at block 730. Following the automatic text, at block 730, a determination is made as to whether the bonafide lead reschedules the call, at block 735. If the bonafide lead reschedules the call, then the sales process 500 continues to the method 600 as graphically depicted in FIG. 6. If the bonafide lead does not reschedule the call, then the method 700 ends at block 740.

Figure 8:
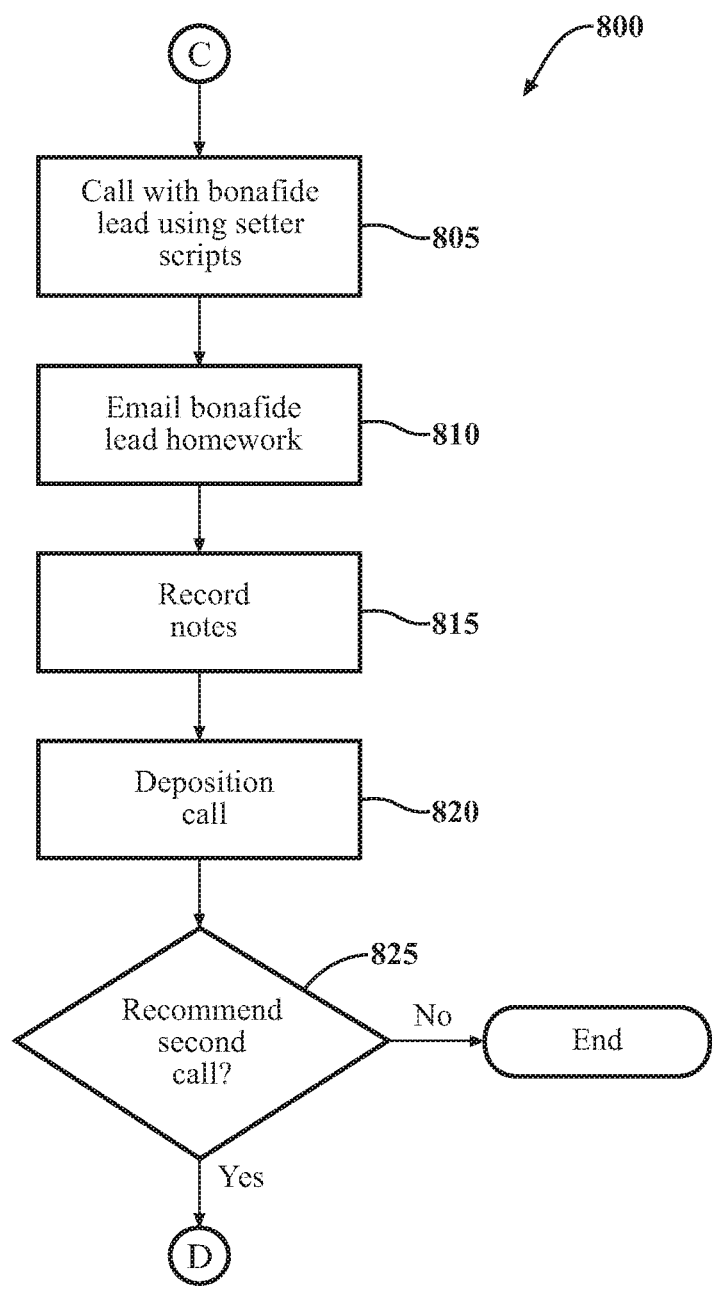
FIG. 8 depicts a flow diagram of an illustrative method of a setter call of the sales process of FIG. 5 according to one or more embodiments shown and described herein.

Referring now to FIGS. 5 and 8, in which FIG. 8 is a flow diagram that graphically depicts an illustrative method 800 of a setter call of the sales process 500 is provided. Although the steps associated with the blocks of FIG. 8 will be described as being separate tasks, in other embodiments, the blocks may be combined or omitted. Further, while the steps associated with the blocks of FIG. 8 will described as being performed in a particular order, in other embodiments, the steps may be performed in a different order.

At block 805, a call between the bonafide lead and the assigned sales team member where the sales team member uses a plurality of setter scripts. The call may be an Aircall®, or other cloud initiated call. Further, the plurality of Setter scripts may include scripts intended to probe, or find out the bonafide leads reason for signing up for the call, goals, successes, and other information that can be used in the scripts to convince the bonafide lead to purchase the particular sales product. For example, finding a pain in the bonafides background (e.g., broke, tired of working too many hours, commute time, and/or the like) and use that background pain within the setter scripts to close the deal. At block 810, the bonafide lead is emailed homework. Example homework may include a second survey geared towards finding out how motivated the bonafide lead, to gauge a commitment, and other information to assist in the closing of the sale. Further, the sales team member records notes of the call, at block 815, and a disposition of the call, at block 820. In some embodiments, each of the notes of the call and/or the disposition of the call may be recorded in various customer relationship management software. For instance, the notes and disposition of the call may be stored in HubSpot®. Further, the assigned sales team member determines whether the bonafide lead qualifies to continue in the sales process, and if so, recommends a second call and schedules the call, at block 825. If the assigned sales team member determines that the bonafide lead does not qualify to continue in the sales process, the method 800 ends at block 830. If the assigned sales team member determines that the bonafide lead qualifies to continue in the sales process at block 825, then the sales process 500 continues to the method 900 as graphically depicted in FIG. 9.

Figure 9:
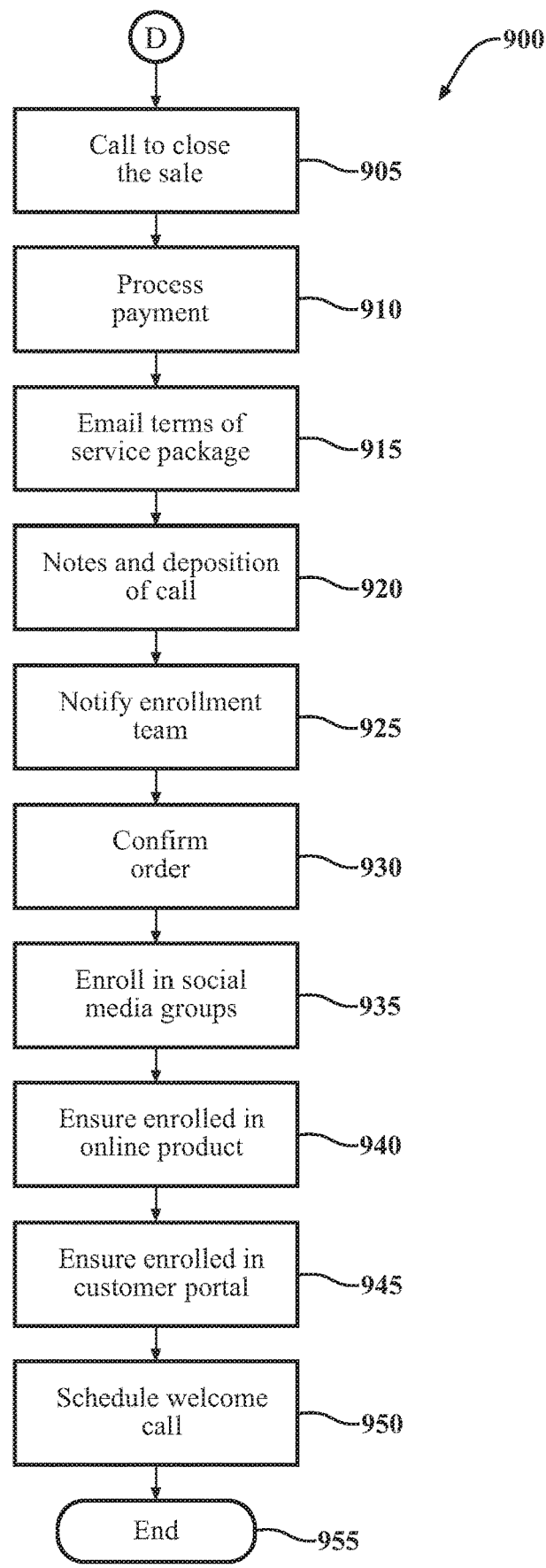
FIG. 9 depicts a flow diagram of an illustrative method of a closer and enrollment call of the sales process of FIG. 5 according to one or more embodiments shown and described herein.

Referring now to FIGS. 5 and 9, in which FIG. 9 is a flow diagram that graphically depicts an illustrative method 900 of a closer and enrollment call of the sales process 500 is provided. Although the steps associated with the blocks of FIG. 9 will be described as being separate tasks, in other embodiments, the blocks may be combined or omitted. Further, while the steps associated with the blocks of FIG. 9 will described as being performed in a particular order, in other embodiments, the steps may be performed in a different order.

At block 905, a call between the bonafide lead and the assigned sales team member where the sales team member uses a plurality of closing scripts. The call may be an Aircall®, or other cloud initiated call. Further, the plurality of closer scripts may include setting an agenda, qualify the bonafide lead for the particular sales product, using the scripts to probe, or find out the bonafide leads reason for signing up for the call, goals, successes, and other information that can be used in the scripts to convince the bonafide lead to purchase the particular sales product. For example, finding a pain in the bonafide leads background (e.g., broke, tired of working too many hours, commute time, and/or the like) and use that pain within the closer scripts to paint a picture without the pain and offering a solution to get to that picture to close the deal.

A payment is processed for the specific sales product, such as a training program, at block 910. A terms of service mail is sent to the customer, at block 915, and notes and disposition of the call are recorded at block 920. In some embodiments, each of the notes of the call and/or the disposition of the call may be recorded in various customer relationship management software. For instance, the notes and disposition of the call may be stored in HubSpot®. The enrollment team is simultaneously notified of the customer and the sale, at block 925. The enrollment team member takes over the call without the customer hanging up on the call and confirms the order, at block 930, enrolls the customer in the social media groups, at block 935, enrolls the customer into the online product, at block 940, enrolls the customer into the customer portal, at block 945, and schedule a welcome call with the customer, at block 950 The welcome call may be scheduled with a predetermined period of time. The method 900 ends at block 955.

Figure 10:
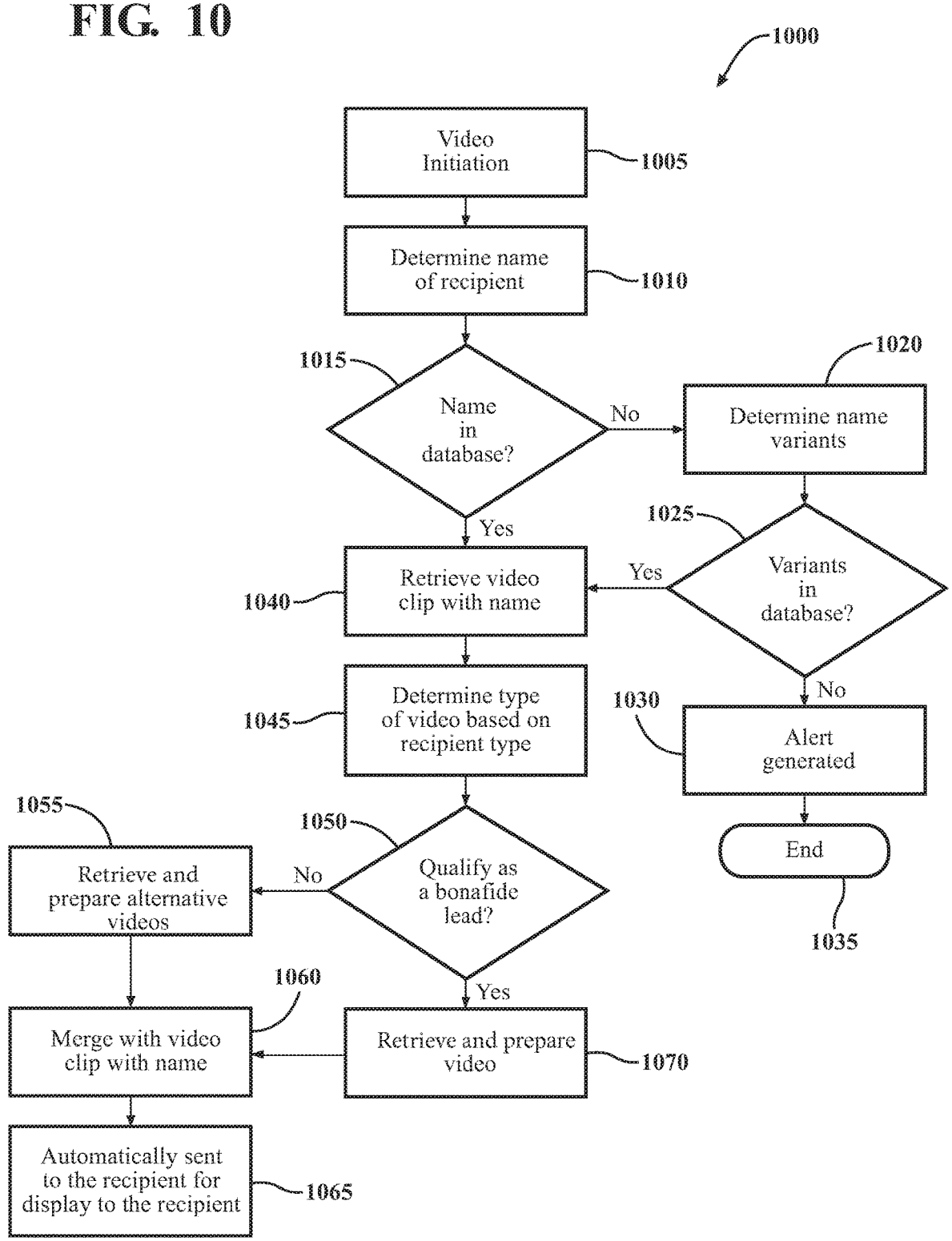
FIG. 10 depicts a flow diagram of an illustrative method of determining a name of the video receipt and merging the name into a customized video according to one or more embodiments shown and described herein.

Referring now to FIG. 10 a flow diagram that graphically depicts an illustrative method 1000 of determining a name of the video receipt and merging the name into a customized video is provided. Although the steps associated with the blocks of FIG. 10 will be described as being separate tasks, in other embodiments, the blocks may be combined or omitted. Further, while the steps associated with the blocks of FIG. 10 will described as being performed in a particular order, in other embodiments, the steps may be performed in a different order.

At block 1005, a video initiation is requested. The video initiation may be a requested by the system automatically once a potential lead or bonafide lead reaches a particular webpage in the process. The name of the recipient (i.e., the bonafide lead and/or potential lead) is determined, at block 1010, and the database is searched for an exact name match at block 1015. It should be appreciated that the name of the recipient may be determined from the saved biographic information in the plurality of customer data 238*d* and/or form external sources (i.e., from an initial contact form and the like).

If it is determined, at block 1015, that there is not an exact name match, then a name variant is determined, at block 1020, and the database is searched for a variant name match at block 1025. For example, if the exact name is "Erin" then variants of "Erin" are automatically determined and such variants may include, for example, "Erinn", "Arryn", "Arron". "Aaron", "Aron" and the like. If a name variant is not found in the database at block 1025, then an alert is generated at block 1030 and the illustrative method 1000 ends at block 1035. The alert generated may be an email, text message, instant message, graphic on a graphical user interface, or any other alert to bring attention to the sales management team that the customized or personalized video needs the name recorded. As such, only a root name needs to be recorded one time and the system will recognize the variant and initiate the video with the prerecorded name to customize or personalize each video regardless of whether the video is the first or second thank you video. It should be understood that as used herein, recorded or prerecorded, may mean audio recoded, video recorded, text recorded, and/or the like If the exact name is found in the database at block 1015, or the variant of the name is found in the database, at block 1025, then the video clip with the exact name and/or variant name, is retrieved, at block 1040, the video type based on the recipient type is determined at block 1045, and if the recipient type is determined to be a bonafide lead, at block 1050, then the bonafide lead video type is prepared, at block 1070. On the other hand, if the recipient type is an alternative sales package, or does not qualify at this time as a bonafide lead at block 1050, then at block 1055, alternate videos are prepared.

It should be appreciated, that in some embodiments, the video for the bonafide lead may be intended to reinforce the sales relationship for the bonafide lead while the video for the alternative sales product or for leads who do not qualify yet as bonafide lead may be intended to continue to sell the product and inform the potential lead of alternative products that may meet their specific situation (i.e., money to invest) and this provides motivation to continue and if, possible, spend more for the full product, but if not, still close the sale for an alternative sales product from the potential lead.

Once either the alternative video is prepared at block 1055 or the bonafide video is prepared at block 1070, the prepared video is merged with the video clip with the exact name or a variant name, at block 1060, and the completed video is automatically sent to the recipient for display to the recipient.

It should be appreciated that the disclosed systems and methods are configured to generate and maintain a customer from a bonafide lead for a particular sales product, such as a training program. Moreover, the disclosed systems and methods provide an approach that provides a sales service to improve sales while minimizing refunds and lost sales. That is, embodiments described herein provide a customer onboarding process that efficiently using a sales team to close a bonafide lead into a customer while simultaneously prepping an enrollment team, which is on standby, so that as soon as the now customer is sold, the enrollment team contacts the customer without having to hang up with the sales person.

It should be appreciated that one embodiment is directed to systems and methods where an enrollment team is trained to get the customer set up on the systems, a second welcome call is placed within a predetermined amount of time to the customer to further solidify the deal, using social media groups that require customers to "check in" to encourage customers to participate in the groups, using purposeful placement of key information and announcements in the groups, welcoming new members to the group and providing strategies to encourage and lift up those customers are participating the most and live streams are hosted directly within the groups and posting the livestream schedule in the groups.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for generating a customer, the method comprising:
   scheduling, by a bonafide lead, a communication appointment with a first sales team member;
   sending, by an interface device, a first automatic text message to the bonafide lead that contains a link to a video;
   sending, by the interface device, a second automatic text message to the bonafide lead that contains a biographic information of the first sales team member;
   placing, by the first sales team member, a confirmation call with the bonafide lead to confirm the communication appointment;
   conducting, by the first sales team member, a first sales call with the bonafide lead;
   using, by the first sales team member, a plurality of setter scripts during the first sales call with the bonafide lead to determine:
   a background of the bonafide lead,
   at least one goal of the bonafide lead, and
   at least one previous success of the bonafide lead,
   providing, by a sales team member computing device, a homework assignment via a first e-mail for the bonafide lead to complete,
   determining, by the first sales team member, whether the bonafide lead qualifies for a second sales call based on whether the bonafide lead meets predetermined factors, the predetermined factors are:
   a background pain derived from the background of the bonafide lead,
   the goal of the bonafide lead,
   the previous success of the bonafide lead, and
   the completed assigned homework,
   conducting, by a second sales team member, the second sales call with the bonafide lead;
   receiving, by the second sales team member, a payment for a specific product or service from the bonafide lead;
   sending, by the sales team member computing device, a terms of service via a second e-mail for the bonafide lead to approve;
   receiving, from the bonafide lead, the approved terms of service and converting the bonafide lead into a confirmed customer; and
   notifying, by the second sales team member, an enrollment team member of the confirmed customer, wherein the notification of the enrollment team member occurs during the second sales call and the confirmed customer is transferred to a member of the enrollment team member before the second sales team member ends the second sales call with the confirmed customer;
   confirming, by the enrollment team member, a confirmation of the payment of the specific sales product or service;
   enrolling, by the enrollment team member, the confirmed customer into at least one social media group;
   enrolling, by the enrollment team member, the confirmed customer into a customer portal and a trial period of a fast track portal;
   scheduling, by the enrollment team member, a welcome call;
   generating, by the interface device, a customer score based on a plurality of sales data for each confirmed customer that includes a product sales over a predetermined period of time;

transmitting, by the interface device, the customer score to a scoreboard for displaying onto the at least one social media group;

ranking, by the interface device, the customer score for each confirmed customer over the predetermined amount of time and identifying a plurality of most successful confirmed customers over the predetermined amount of time; and displaying, by the interface device onto the least one social media group, the scoreboard for each confirmed customer for each member of the at least one social media group in the ranked order to view so to distinguish the plurality of most successful confirmed customers and to provide a motivation to other confirmed customers.

2. The method of claim 1, wherein the confirmed customer is required to check in to the at least one social media group at predetermined time intervals.

3. The method of claim 2, wherein the predetermined time intervals is once a day.

4. The method of claim 1, wherein the scoreboard displays a plurality of individual customer scores for each confirmed customer.

5. The method of claim 4, wherein at least one of the plurality of individual customer scores includes a numerical percentage for product sales over a predetermined period.

6. The method of claim 4, wherein the scoreboard is updated in real time.

7. The method of claim 6, wherein:
the at least one social media group displays, via the interface device, a customer recognition dashboard that displays an individual scoreboard having the plurality of individual customer scores for each confirmed customer based on a plurality of predetermined factors.

8. The method of claim 7, wherein the plurality of predetermined factors include the at least one of the plurality of individual customer scores based on product sales over a predetermined period or a numerical percentage for product sales over the predetermined period.

9. The method of claim 8, wherein the predetermined period is one month.

10. The method of claim 1, wherein:
the fast track portal includes a video display and a chat window to provide one-on-one coaching between a coach and the confirmed customer.

11. The method of claim 1, further comprising,
determining, by the sales team computing device, an appropriate script of a plurality of scripts for the first or second sales team member to follow to provide the confirmed customer with the motivation,
wherein the motivation provided to other confirmed customers is dictated by the customer score displayed on the scoreboard.

12. The method of claim 11, further comprising,
displaying, by the sales team computing device, a graphical user interface to display visualizations of the determined appropriate script of the plurality of scripts for the first or second sales team member to follow.

* * * * *